United States Patent [19]

Aoki et al.

[11] Patent Number: 5,304,854
[45] Date of Patent: Apr. 19, 1994

[54] SIGNAL TRANSIENT IMPROVEMENT CIRCUIT

[75] Inventors: Kazuyo Aoki, Omiya; Tomoki Saeki, Yokohama, both of Japan

[73] Assignee: RCA Thomson Licensing Corporation, Princeton, N.J.

[21] Appl. No.: 829,836

[22] Filed: Feb. 3, 1992

[51] Int. Cl.[5] .......................... H03K 5/12; H03K 6/04
[52] U.S. Cl. ..................................... 307/263; 307/517; 328/109
[58] Field of Search ............... 307/263, 517, 268, 602, 307/595, 597; 328/55, 109; 358/37, 166

[56] References Cited

U.S. PATENT DOCUMENTS

| | | | |
|---|---|---|---|
| 3,778,543 | 12/1973 | Lowry | 178/5.4 R |
| 4,553,042 | 11/1985 | Batterman | 307/263 |
| 4,587,448 | 5/1986 | Batterman | 307/517 |
| 4,623,805 | 11/1986 | Flora et al. | 328/55 |
| 4,758,891 | 7/1988 | Hitchcock et al. | 307/263 |
| 4,777,385 | 10/1988 | Hartmeier | 307/263 |
| 5,151,787 | 9/1992 | Pank | 307/263 |
| 5,196,736 | 3/1993 | Doornhein et al. | 307/263 |

OTHER PUBLICATIONS

H. Harlos, "Picture Signal Improvement In Colour TV Receivers", IEEE Trans. on Consumer Elect., vol. CE-31, No. 3; Aug. 1985, pp. 156-162.

Primary Examiner—Timothy P. Callahan
Attorney, Agent, or Firm—Joseph S. Tripoli; Eric P. Herrmann; Ronald H. Kurdyla

[57] ABSTRACT

A transition enhancing circuit includes a tapped delay line which provides successively delayed replicas of the signal to be processed. A multiplexer, responsive to a signal transition, sequentially couples delayed signal from the center tap and taps more distant from the input of the delay line to an output terminal to effectively hold the initial value of the transition for approximately half the transition period. The taps at the input end of the delay line up to and including the center tap are then sequentially coupled to the output terminal to effectively advance, in time, the end value of the signal transition. The signal transition is thereby reduced to a time equivalent to the switching interval between taps.

6 Claims, 7 Drawing Sheets

| ADD | COUNT | | | | | | | | | | | | | | | |
|---|---|---|---|---|---|---|---|---|---|---|---|---|---|---|---|---|
| | 0 | 2 | 3 | 4 | 5 | 6 | 7 | 8 | 9 | 10 | 11 | 12 | 13 | 14 | 15 | 16 |
| 0 | C | C | C | C | C | C | C | C | C | C | C | C | C | C | C | C |
| 1 | C | C | C | C | C | C | C | C | C | C | C | C | C | C | C | 1 |
| 2 | C | C | C | C | C | C | C | C | C | C | C | C | C | C | 1 | 2 |
| 3 | C | C | C | C | C | C | C | C | C | C | C | C | C | 1 | 2 | 3 |
| 4 | C | C | C | C | C | C | C | C | C | C | C | C | 1 | 2 | 3 | 4 |
| 5 | C | C | C | C | C | C | C | C | C | C | C | 1 | 2 | 3 | 4 | 5 |
| 6 | C | C | C | C | C | C | C | C | C | C | 1 | 2 | 3 | 4 | 5 | 6 |
| 7 | C | C | C | C | C | C | C | C | C | 1 | 2 | 3 | 4 | 5 | 6 | 7 |
| 8 | C | C | C | C | C | C | C | C | 1 | 2 | 3 | 4 | 5 | 6 | 7 | 8 |
| 9 | C | C | C | C | C | C | C | 1 | 2 | 3 | 4 | 5 | 6 | 7 | 8 | 9 |
| 10 | C | C | C | C | C | C | 1 | 2 | 3 | 4 | 5 | 6 | 7 | 8 | 9 | 10 |
| 11 | C | C | C | C | C | 1 | 2 | 3 | 4 | 5 | 6 | 7 | 8 | 9 | 10 | 11 |
| 12 | C | C | C | C | 1 | 2 | 3 | 4 | 5 | 6 | 7 | 8 | 9 | 10 | 11 | 12 |
| 13 | C | C | C | 1 | 2 | 3 | 4 | 5 | 6 | 7 | 8 | 9 | 10 | 11 | 8 | 8 |
| 14 | C | C | 1 | 2 | 3 | 4 | 5 | 6 | 6 | 6 | 6 | 6 | 6 | 6 | 6 | 6 |
| 15 | C | 1 | 2 | 3 | 4 | 5 | 4 | 4 | 4 | 4 | 4 | 4 | 4 | 4 | 4 | 4 |
| 16 | C | 2 | 3 | 1 | 2 | 2 | 2 | 2 | 2 | 2 | 2 | 2 | 2 | 2 | 2 | 2 |
| 17 | C | C | C | C | C | C | C | C | C | C | C | C | C | C | C | C |
| 18 | C | -2 | -3 | -1 | -2 | -2 | -2 | -2 | -2 | -2 | -2 | -2 | -2 | -2 | -2 | -2 |
| 19 | C | -1 | -2 | -3 | -4 | -5 | -4 | -4 | -4 | -4 | -4 | -4 | -4 | -4 | -4 | -4 |
| 20 | C | C* | -1 | -2 | -3 | -4 | -5 | -6 | -6 | -6 | -6 | -6 | -6 | -6 | -6 | -6 |
| 21 | C | C* | C* | -1 | -2 | -3 | -4 | -5 | -6 | -7 | -8 | -9 | -10 | -11 | -8 | -8 |
| 22 | C | C* | C* | C* | -1 | -2 | -3 | -4 | -5 | -6 | -7 | -8 | -9 | -10 | -11 | -12 |
| 23 | C | C* | C* | C* | C* | -1 | -2 | -3 | -4 | -5 | -6 | -7 | -8 | -9 | -10 | -11 |
| 24 | C | C* | C* | C* | C* | C* | -1 | -2 | -3 | -4 | -5 | -6 | -7 | -8 | -9 | -10 |
| 25 | C | C* | C* | C* | C* | C* | C* | -1 | -2 | -3 | -4 | -5 | -6 | -7 | -8 | -9 |
| 26 | C | C* | C* | C* | C* | C* | C* | C* | -1 | -2 | -3 | -4 | -5 | -6 | -7 | -8 |
| 27 | C | C* | C* | C* | C* | C* | C* | C* | C* | -1 | -2 | -3 | -4 | -5 | -6 | -7 |
| 28 | C | C* | C* | C* | C* | C* | C* | C* | C* | C* | -1 | -2 | -3 | -4 | -5 | -6 |
| 29 | C | C* | C* | C* | C* | C* | C* | C* | C* | C* | C* | -1 | -2 | -3 | -4 | -5 |
| 30 | C | C* | C* | C* | C* | C* | C* | C* | C* | C* | C* | C* | -1 | -2 | -3 | -4 |
| 31 | C | C* | C* | C* | C* | C* | C* | C* | C* | C* | C* | C* | C* | -1 | -2 | -3 |
| 32 | C | C* | C* | C* | C* | C* | C* | C* | C* | C* | C* | C* | C* | C* | -1 | -2 |
| 33 | C | C* | C* | C* | C* | C* | C* | C* | C* | C* | C* | C* | C* | C* | C* | -1 |

FIG.8

| ADDRESS | COUNT | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 |
| 0 | C | C | C | C | C | C | C | C | C | C | C | C | C | C | C |
| 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 | 2 | 2 | 2 |
| 3 | C | 3 | 3 | 3 | 3 | 3 | 3 | 3 | 3 | 3 | 3 | 3 | 3 | 3 | 3 |
| 4 | -2 | C | 1 | 4 | 4 | 4 | 4 | 4 | 4 | 4 | 4 | 4 | 4 | 4 | 4 |
| 5 | -1 | -3 | C | 2 | 5 | 5 | 5 | 5 | 5 | 5 | 5 | 5 | 5 | 5 | 5 |
| 6 | C* | -2 | -1 | C | 2 | 4 | 6 | 6 | 6 | 6 | 6 | 6 | 6 | 6 | 6 |
| 7 | C* | -1 | -3 | -2 | C | 2 | 4 | 6 | 7 | 7 | 7 | 7 | 7 | 7 | 7 |
| 8 | C* | C* | -2 | -4 | -2 | C | 2 | 4 | 6 | 8 | 8 | 8 | 8 | 8 | 8 |
| 9 | C* | C* | -1 | -3 | -5 | -2 | C | 2 | 4 | 6 | 9 | 9 | 9 | 9 | 9 |
| 10 | C* | C* | C* | -2 | -4 | -4 | -2 | C | 2 | 4 | 6 | 10 | 10 | 10 | 10 |
| 11 | C* | C* | C* | -1 | -3 | -5 | -4 | -2 | C | 2 | 4 | 6 | 11 | 11 | 11 |
| 12 | C* | C* | C* | C* | -2 | -4 | -6 | -4 | -2 | C | 2 | 4 | 6 | 8 | 12 |
| 13 | C* | C* | C* | C* | -1 | -3 | -5 | -6 | -4 | -2 | C | 2 | 4 | 6 | 8 |
| 14 | C* | C* | C* | C* | C* | -2 | -4 | -6 | -6 | -4 | -2 | C | 2 | 4 | 6 |
| 15 | C* | C* | C* | C* | C* | -1 | -3 | -5 | -7 | -6 | -4 | -2 | C | 2 | 4 |
| 16 | C* | C* | C* | C* | C* | C* | -2 | -4 | -6 | -8 | -6 | -4 | -2 | C | 2 |
| 17 | C* | C* | C* | C* | C* | C* | -1 | -3 | -5 | -7 | -9 | -6 | -4 | -2 | C |
| 18 | C* | C* | C* | C* | C* | C* | C* | -2 | -4 | -6 | -8 | -10 | -6 | -4 | -2 |
| 19 | C* | C* | C* | C* | C* | C* | C* | -1 | -3 | -5 | -7 | -9 | -11 | -6 | -4 |
| 20 | C* | C* | C* | C* | C* | C* | C* | C* | -2 | -4 | -6 | -8 | -10 | -8 | -6 |
| 21 | C* | C* | C* | C* | C* | C* | C* | C* | -1 | -3 | -5 | -7 | -9 | -11 | -8 |
| 22 | C* | C* | C* | C* | C* | C* | C* | C* | C* | -2 | -4 | -6 | -8 | -10 | -12 |
| 23 | C* | C* | C* | C* | C* | C* | C* | C* | C* | -1 | -3 | -5 | -7 | -9 | -11 |
| 24 | C* | C* | C* | C* | C* | C* | C* | C* | C* | C* | -2 | -4 | -6 | -8 | -10 |
| 25 | C* | C* | C* | C* | C* | C* | C* | C* | C* | C* | -1 | -3 | -5 | -7 | -9 |
| 26 | C* | C* | C* | C* | C* | C* | C* | C* | C* | C* | C* | -2 | -4 | -6 | -8 |
| 27 | C* | C* | C* | C* | C* | C* | C* | C* | C* | C* | C* | -1 | -3 | -5 | -7 |
| 28 | C* | C* | C* | C* | C* | C* | C* | C* | C* | C* | C* | C* | -2 | -4 | -6 |
| 29 | C* | C* | C* | C* | C* | C* | C* | C* | C* | C* | C* | C* | -1 | -3 | -5 |
| 30 | C* | C* | C* | C* | C* | C* | C* | C* | C* | C* | C* | C* | C* | -2 | -4 |
| 31 | C* | C* | C* | C* | C* | C* | C* | C* | C* | C* | C* | C* | C* | -1 | -3 |
| 32 | C* | C* | C* | C* | C* | C* | C* | C* | C* | C* | C* | C* | C* | C* | -2 |
| 33 | C* | C* | C* | C* | C* | C* | C* | C* | C* | C* | C* | C* | C* | C* | -1 |

SIGNAL TRANSIENT IMPROVEMENT CIRCUIT

This invention relates to circuitry for signal transition improvement which is useful, for example, for enhancing signals in a color television receiver.

BACKGROUND OF THE INVENTION

Signal transition enhancement circuitry for use in color television signal processing apparatus is known from, for example, U.S. Pat. No. 4,777,385 and the article by Hartmut Harlos, "Picture Signal Improvement In Colour TV Receivers", published in the IEEE Transitions on Consumer Electronics, Vol. CE-31, No. 3, August 1985, both of which are incorporated herein by reference. The Harlos article describes an analog processing approach to transition enhancement and U.S. Pat. No. 4,777,385 describes primarily a digital approach to transition enhancement. In both systems, signal transitions having slopes greater than a predetermined value are detected. Responsive to the detected transitions, circuitry is employed to hold the initial amplitude value of the transition for a portion of the duration of the transition and thereafter the final value of the signal transition is coupled to the signal output device. The transition is shortened to the time required to switch between the initial and final values of the transition, which time is typically much shorter than the original transition time. The Harlos system accomplishes this function by incorporating a series switch in the signal path followed by a storage capacitor having one terminal coupled to a point of fixed potential. The series switch is maintained closed until a transition is detected, at which time the switch is opened. The value of the signal at the beginning of the transition is stored on the capacitor and output to further processing circuitry. A predetermined time after the switch is opened it is returned to the closed condition to couple the incoming signal to the capacitor and the further processing circuitry.

In U.S. Pat. No. 4,777,385, input signal, represented by, for example, binary samples, is applied to a serial-input-parallel-output shift register. The parallel outputs are coupled to respective inputs of an N-input-to-one-output multiplexer. A modulo N counter is coupled to address the multiplexer. In the absence of transitions the multiplexer is conditioned to pass signal from the center tap of the shift register. Responsive to the detection of a signal transition, the counter is enabled to condition the multiplexer to successively pass signal samples from the center tap and subsequent taps toward the end of the shift register, then to successively pass samples from a tap at the beginning of the shift register and subsequent taps toward the center tap. In this manner transients are compressed to a single sample period.

The drawback of the foregoing transition enhancement systems is that all detected signal transitions are compressed to the same transition time. This feature tends to undesirably distort some signal components rather than enhance them. The present invention is arranged to variably enhance signal transition according to a feature of the particular transition detected.

SUMMARY OF THE INVENTION

The present transition enhancement apparatus includes a tapped delay line to which input signal is applied. Respective taps of the delay line are coupled to respective input terminals of a multiplexer. The multiplexer includes control circuitry which is programmed to sequentially pass signal from respective ones of the taps according to a plurality of tap selection patterns. A signal transition detector, responsive to the signal applied to the delay line, measures a feature of a detected transition, and responsive thereto conditions the control circuitry of the multiplexer to pass signal according to one of the tap selection patterns.

DETAILED DESCRIPTION

The invention may be practiced, at least in part, in either analog or digital form. Depending upon the choice of circuit elements, additional compensating delay elements may be required in certain signal paths. In general compensating delay elements have been omitted to avoid introducing confusion into the description and drawings. However, one skilled in the art of circuit design will readily recognize where such compensating delay elements are required.

Figure 1A:
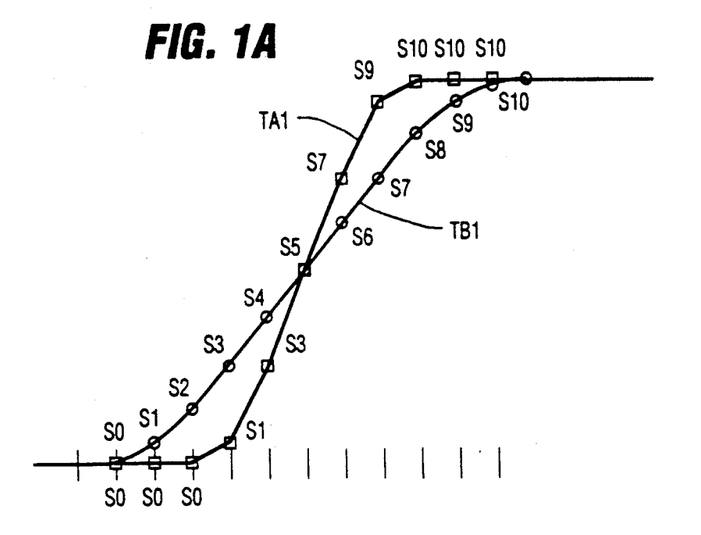
FIGS. 1A and 1B are time versus amplitude diagrams of signal transitions useful in describing the invention.
Figure 1B:
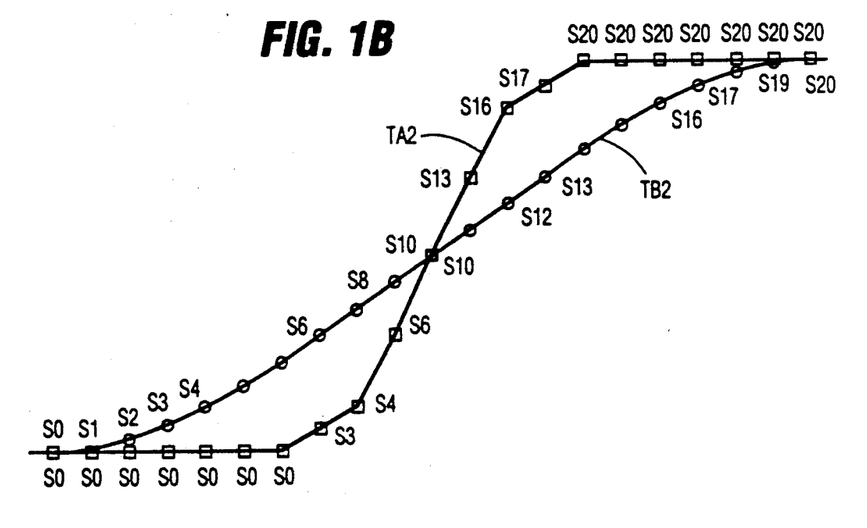

The desired resultant of the invention is the sharpening of signal transitions which have undergone an increase in transition time due to, for example, bandwidth limiting. The resultant is illustrated in FIGS. 1A and 1B for two transitions of differing rise times or slew rates. In FIG. 1A, a first transition designated TB1 occurs over a period of 11 sample intervals s0–s10. In the transition enhancement apparatus of the prior art this transition would be shortened to a period of one or two transition intervals by holding the original sample value, s0, until, for example sample time s5, and then advancing in time, the sample value s10. The present apparatus measures the duration of the transition, and selects various ones of the sample values (less than all transition sample values) to form the new transition TA1 dependent upon the duration of the transition. It can be seen that in this example the new transition, TA1, is constructed of seven (s0, s1, s3, s5, s7, s9, s10) of the original sample values with a transition duration extending only over substantially a five sample interval. Note that while the original transition is generally a smooth curve the enhanced transition is piecewise linear.

The second example, illustrated in FIG. 1B, includes a transition TB2, having a duration of 21 sample intervals s0–s20. In this instance a new transition is constructed from nine of the original samples so, s3, s4, s6, s10, s13, s16, s17, and s20. The duration of the newly constructed transition is approximately 8 sample periods rather than the original 20. It is noted that the new transition of the second example is longer than the new transition for the FIG. 1A example. That is, the reconstructed transition is tailored to the length of the original transition.

Figure 2:
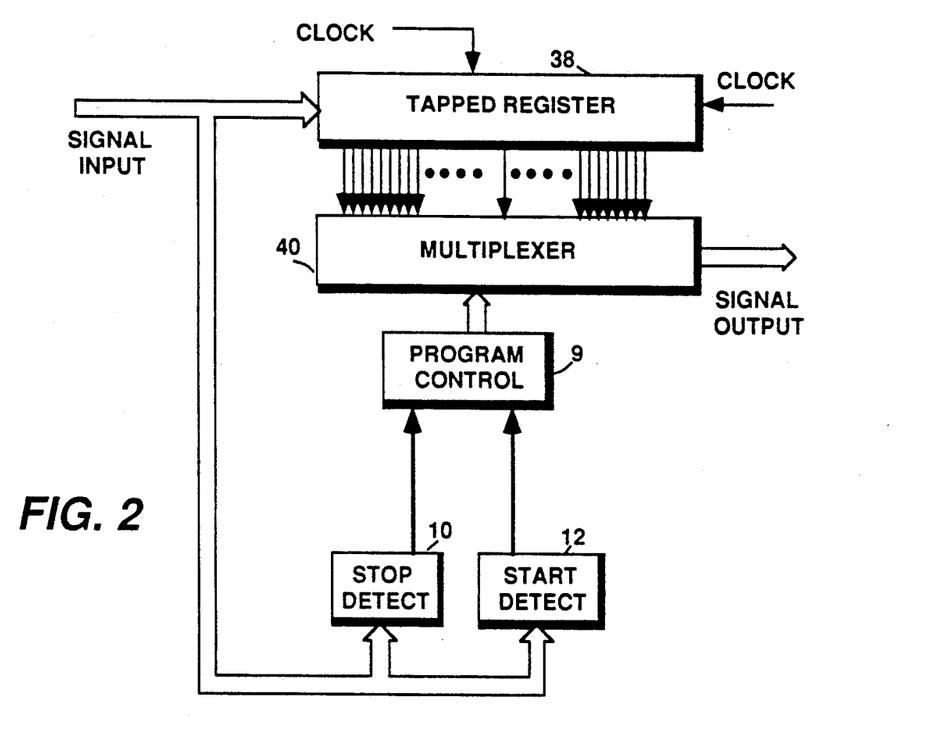
FIG. 2 is a block diagram of a general form of transition enhancing apparatus embodying the invention.

FIG. 2 illustrates the general form of the invention, for providing tailored transition enhancement responsive to the duration of signal transitions. Input signal samples for which transitions are to be modified are applied to a tapped delay line 38, which is clocked at the applied sample rate. The delay line has a plurality, P, of successive output taps coupled to a P-to-one multiplexer 40. In the absence of signal transitions the multiplexer is conditioned to couple signal from a center tap of the delay line to a signal output port. On the occurrence of a transition the multiplexer 40 is addressed by a program control element 9 to couple respective ones of the output taps to the signal output port according to one of a plurality of connection sequences.

The input signal samples are applied to a start detector 12 and a stop detector 10. The start detector 12 is arranged to detect the start of signal transitions, and responsive thereto generate a start signal.

The stop detector is arranged to generate a pulse signal which occurs at a predetermined point in the transition (for example the middle or endpoint of the transition). For this example it will be assumed that the stop detector generates a pulse substantially at the center point of transitions. The signals from the start and stop detectors are coupled to the program control element 9, which in this example is responsive to the time interval between the occurrence of the detection of the start and midpoint of respective transitions to adaptively develop sequences of control signals for application to the multiplexer 40.

Figure 3:
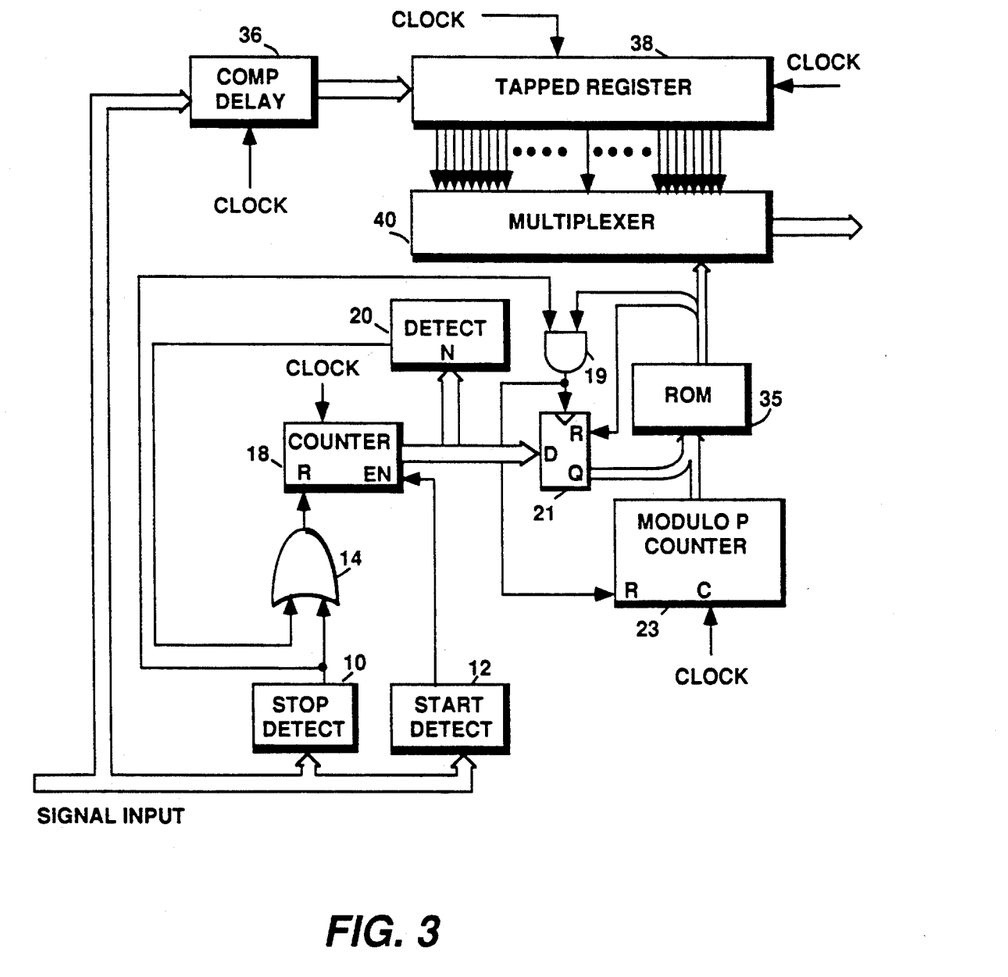
FIGS. 3 and 4 are block diagrams of alternative signal transition enhancement circuitry embodying the present invention.

FIG. 3 illustrates a more specific embodiment of the invention. In FIG. 3 elements designated with the same numbers as elements in FIG. 2 are similar and provide the same functions. The function of the program control element 9 is provided by the circuit elements 14-35. The read only memory (ROM) 35 is programmed with a plurality of tables, each of which contains a sequence of multiplexer connection control signals arranged to condition the multiplexer to couple delayed signals from specific taps of the delay line, in a particular order, to the signal output port.

The start and stop signals from detectors 12 and 10 respectively are coupled to ENABLE and RESET terminals of a counter 18. A clock signal having a pulse rate equal to the applied sample rate is coupled to a clock input terminal of the counter 18. Responsive to the leading edge of the start signal, the counter is enabled to count clock pulses, and responsive to the stop signal the counter is reset to a zero value. The output or count values generated by the counter 18 are coupled to the data input terminal of a data latch 21. The stop signal is applied to the data latch 21 (via AND gate 19) to condition the latch 21 to store the count value provided by the counter occurring immediately before the occurrence of the stop signal. The latch 21 therefor contains a value which is substantially equal to one half the current transition duration. Note, due to noise or system accuracies, there will always be a slight ambiguity between the actual and counted transition periods.

Figure 7:
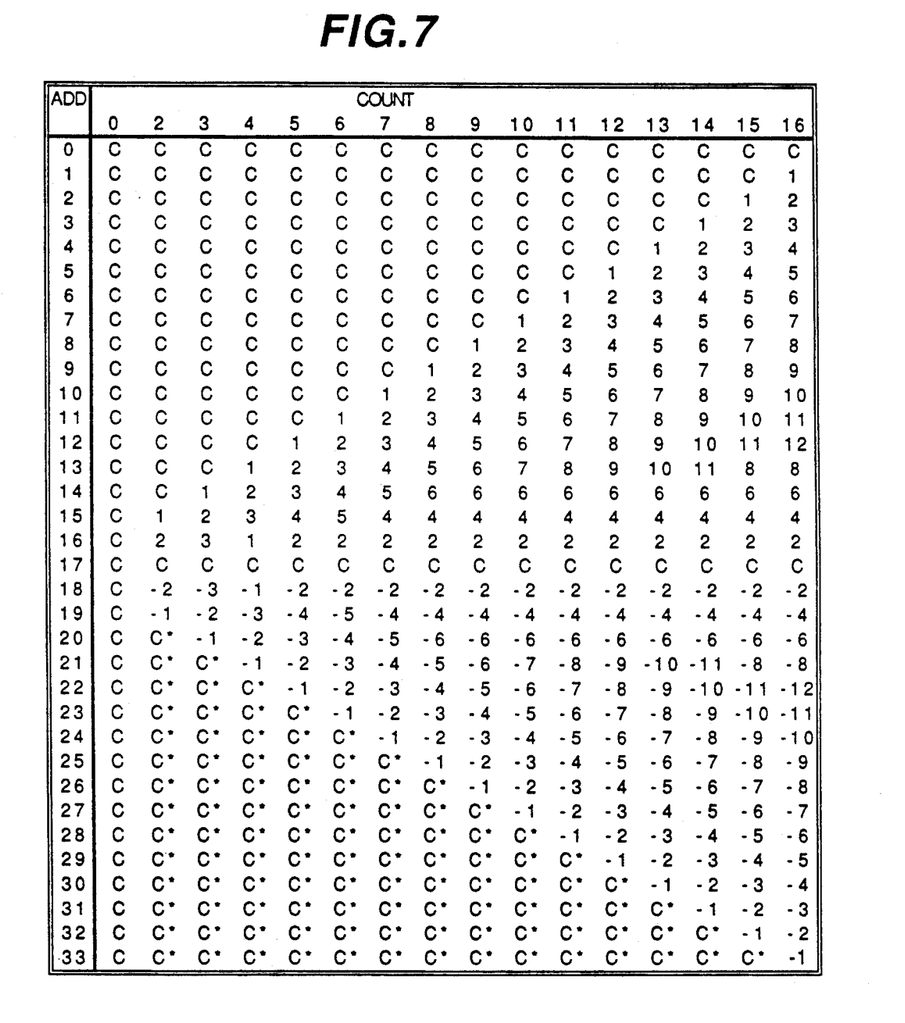
FIG. 7 is a listing of exemplary table entries programmed in the ROM 35 of FIG. 3.

The value stored in the latch 21 is applied as a partial address to the ROM 35. This partial address is used to select one of the plurality of tables having the multiplexer connection patterns. The remainder of the ROM address is provided by a modulo P counter 23. On the occurrence of a stop pulse the counter 23 is reset to zero, and then commences to count cyclically through 0-P to successively address the entries in the respective table selected by the partial address from the latch 21. Refer to FIG. 7 for an exemplary table of sequences of tap connections. Respective sequences are listed in the respective columns. The column headings are the count values stored in the latch 21 and correspond to the partial addresses, e.g., the column headed 5 is the connection pattern for a transition having a half-duration of 5 sample periods. The leftmost column headed address is the list of ROM row addresses and which addresses are provided by the modulo P counter 23.

The entries in the respective columns are defined thusly. An entry "C" means that the tap to be addressed by the multiplexer is the center tap and has a relative delay of c sample periods. Positive numbers, e.g., 1, 2, 3 correspond to taps exhibiting delays which are longer than the delay exhibited by the center tap. For example the number 2 denotes a tap which exhibits a delay of c+2 sample periods etc. The negative numbers correspond to taps having delays less than the center tap. The number −2 thus indicates the tap exhibiting a delay of c−2 sample periods. The entries "C*" also indicate a center tap connection.

Each of the entries contain additional data bits for system control. One of these data bits is applied to enable the AND gate 19, and the other is applied to reset the latch 21. The data for enabling the AND gate 19 is arranged as follows. Each entry in the first column headed by the partial address "0" includes a logic "1" in this data slot, and all the entries designated "C*" in the other columns have a logic "1" in this data slot. The remaining entries have a logic "0" programmed in this data slot. Thus the AND gate 19 is enabled to pass the stop signal and thereby load a new partial address only if the current ROM address is in column "0" or is accessing an entry having a "C*" designation. This feature is included to insure that the reconstruction of a transition, once started, is not interrupted.

Each entry in the table also includes a reset bit which is applied to reset the latch 21 to a zero partial address value. The zero valued partial address value, addresses the column, or table designated "0" thereby conditioning the system to connect the center tap to the output connection regardless of the state of the counter 23. All entries in the table have a non reset bit value except the entries "C*" which have a reset bit value. Thus the system will be reset to accept a new partial address and process a new transition only after completion of processing a prior transition.

Consider that the elements in the system operate without processing delays, and that the compensating delay 36 is omitted. When the beginning of a transition occurs in the input signal, it is simultaneously detected and input to the first stage of the tapped delay line 38. The signal transition is clocked along the respective stages of the delay line. Assume that the transition has a duration of 10 sample periods, and consequently after 5 sample periods a stop signal is generated, and the beginning of the transition is located 6 stages into the delay line. Assume also that the center tap is at stage 17 of the delay line, and therefor the beginning of the transition is 17 minus 6 or 11 sample periods or taps from the center tap. The beginning of the transition will arrive at the center tap 11 sample periods later. At that time it is desirous to hold the beginning value of the transition for, e.g., four sample periods. Thus, once the beginning value of the transition reaches the center tap, the multiplexer is addressed to sequentially track the beginning value by successively accessing the center tap at address 5/11 and the taps having delays of c+1, c+2, c+3, and c+4 sample periods (having respective addresses 5/12, 5/13, 5/14, and 5/15). A sample having a value near the value of the midpoint of the transition is then accessed by addressing the tap having a delay c+2 sample periods (ROM address 5/16). During the next sample period the midpoint of the transition is available at the center tap, and the center tap is addressed to output this value (ROM address 5/17). A sample occurring just beyond the midpoint of the original transition is then accessed at the tap having a delay of c−2 sample periods (address 5/18). The multiplexer is then conditioned to output the final value of the original transition which is available at the tap exhibiting the delay of c−4 sample periods, and holding this value for the remainder of the transition by successively accessing the taps with delays c−4, c−3, c−2, c−1, c (successive ROM addresses 5/19, 5/20, 5/21, 5/22 and 5/23).

Each of the respective tables (columns) in the ROM is arranged to accommodate the length of the respective transition. Reconstruction of a particular transition starts when a tap other than the center tap is accessed. Transitions having a half-duration of 16 sample periods will have its beginning value located at the center tap when the stop signal occurs, and thus reconstruction commences at address 16/1. Transitions having a half-duration of 15 sample periods will have its beginning value located at the tap exhibiting a delay of c−1 sample periods when the stop signal occurs, and thus reconstruction of this transition commences at address 15/2 and so on. Note, each time a new partial address is stored in latch 21 the counter 23 is reset to zero to initiate reconstruction at the proper address.

The system elements have inherent processing delays, and therefor it is necessary to compensate for these delays. This compensation is provided by the delay element 36. In addition it will be recognized that signal transitions will occur which have not been affected by bandwidth limitations. These transitions will have a duration greater than a predetermined number of sample periods, and should not undergo enhancement. In the exemplary system these transitions are transitions which have a half-duration greater than 16 sample periods. Enhancement of transitions having a half-duration greater than 16 sample periods is precluded by including a detector 20 coupled to the output of the counter 18. If the counter 18 generates a count greater than 16, the detector 20 generates a reset pulse which is applied via the OR gate 14 to reset the counter 18 to a zero count. The counter 18 will remain in the zero state until a further transition of the start signal. Thus if a stop signal occurs after a reset provided by the detector 20, it will condition the latch 21 to store a zero value, which will have no affect on system operation since the latch 21 will have already been reset to a zero value.

Figure 4:
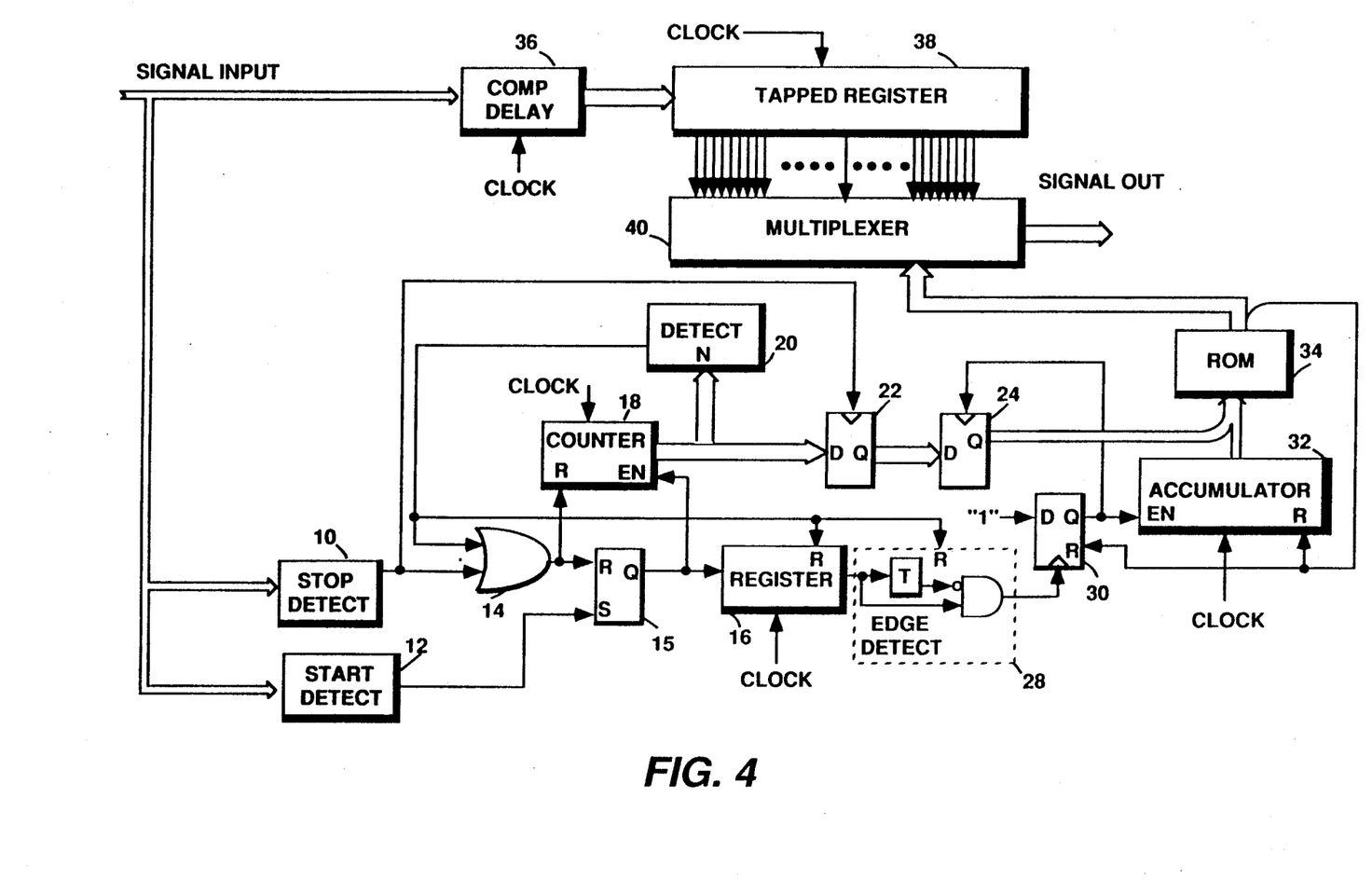

The FIG. 3 system has a shortcoming in that it will miss transitions which occur within close proximity. For example, if the system is arranged to respond according to the tables in FIG. 7 the closest transition intervals that can be responded to must be separated by 20 sample periods as indicated by the required entries in column 2. FIG. 4 illustrates an embodiment which overcomes this limitation.

In FIG. 4, elements designated with the same numbers as elements in FIG. 3 are similar and perform the same functions. Functionally the primary difference between the FIGS. 3 and 4 embodiments is that in FIG. 3 addressing of the pattern ROM 35 starts on the occurrence of a stop pulse, while in FIG. 4 addressing of the pattern ROM 34 starts when the beginning of respective transitions have reached the center tap of the tapped delay line 38. The pattern ROM 34 may therefor be programmed with less dead time allowing the system to respond to closer transitions.

Figure 8:
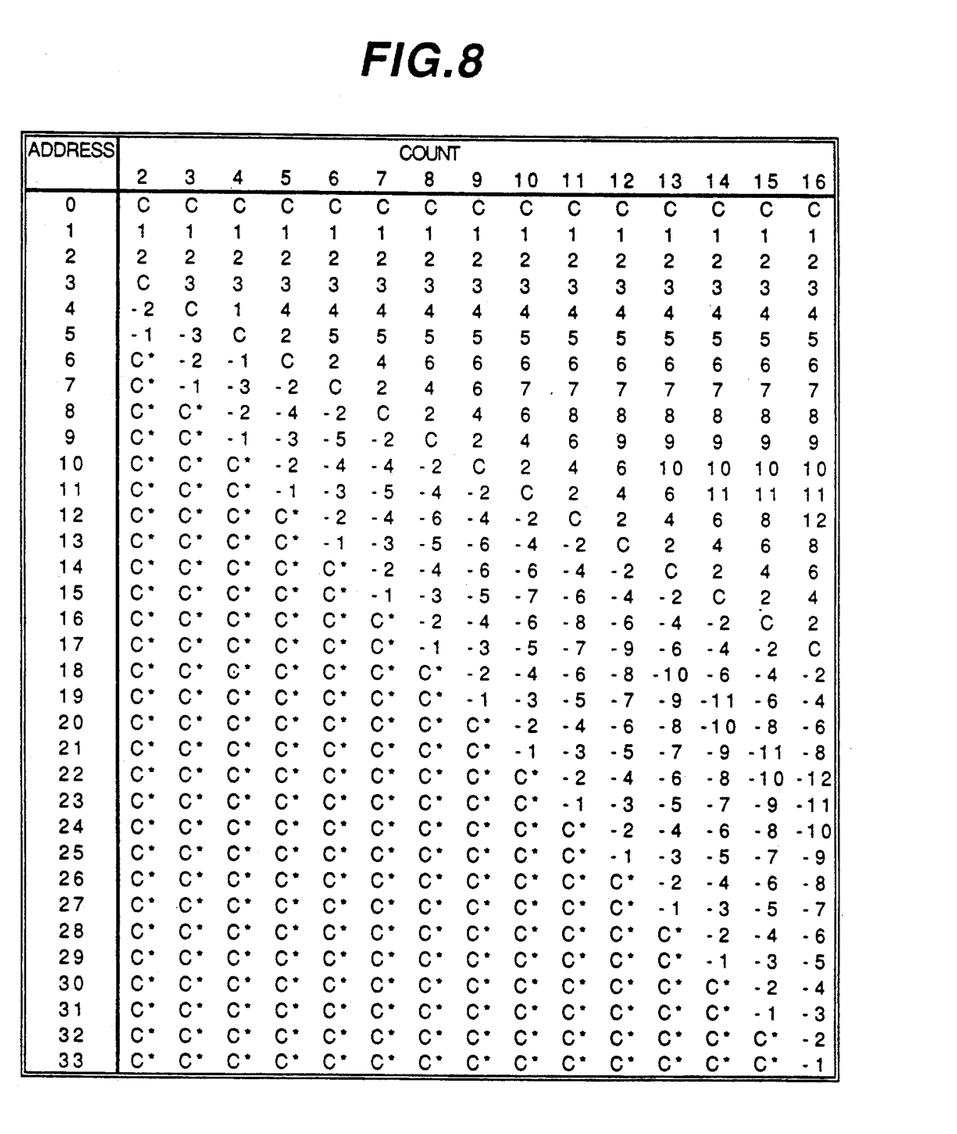
FIG. 8 is a listing of exemplary table entries programmed in the ROM 34 of FIG. 4.

FIG. 8 illustrates exemplary programming of the pattern tables in ROM 34. The entry values C and C* refer to the center tap with a delay of c sample periods. The positive and negative numbers designate taps exhibiting delays of c+i and c−i sample periods respectively. All entries include a reset bit which are coupled to the reset terminals of the accumulator 32 and latch 30. The entries C* have a logic one reset bit and the remaining entries have a logic zero reset bit. For a particular transition the entries in a corresponding column are successively addressed to apply signals to control the multiplexor 40. The tables in FIG. 8 correspond to the tables in FIG. 7. That is, the ROM 34 provides the same transition enhancement functions as the ROM 35 for transitions having the same half-duration.

Consider the column designated 2 and note that reconstruction of the corresponding transition occurs after 6 ROM address cycles. At the end of the reconstruction the system is reset and a new transition can be processed. The time between successive transitions that the system can process is limited only by the system reset interval, which will be in the order of a sample period.

Referring to FIG. 4, the start signal is applied to the set input terminal of a set/reset latch 15. The stop signal is coupled to the reset input terminal of the latch 15. The latch 15 thus provides an output pulse of duration equal to the half-duration of a respective transition. The output of the latch 15 is coupled to the enable input terminal of the counter 18, which is enabled to initiate counting by the leading edge of the output pulse from the latch 15. This pulse is also input to a delay line 16. The delay line 16 is clocked at the applied sample rate. The output terminal of the delay line 16 is coupled to a leading edge detector 28, which develops a pulse when the leading edge of the start signal is output by the delay line 16. The delay line 16 is arranged so that the pulses provided by the pulse detector 28 (which are indicative of the start of respective transition) occur simultaneously with the beginning of the corresponding transitions occurring at the c−1 tap of the tapped delay line 38.

The pulses provided by the edge detector 28 are coupled to the clock input terminal of a data latch 30 which has its data input coupled to a logic one value. Responsive to the pulses from detector 28, the latch 30 provides a logic one level to enable an accumulator 32 to commence accumulating. The accumulator 32 is arranged to successively increment by one unit at the applied sample rate. The accumulated values are applied as ROM address codes for successively addressing the entries in a particular table in the ROM 34. At the end of reconstruction of a respective transition, a reset pulse is provided by the ROM 34 to reset the accumulator 32 to zero, and the latch 30 to zero in preparation for the occurrence of the next transition.

The count values from the counter 18 are stored in the latch 22 responsive to the stop signal provided by the detector 10. The count value stored in the latch 22 is coupled to the data input terminal of a further data latch 24. The latch 24 is responsive to the enable signal from latch 30 to store the count value, and apply it as the partial or table address to the ROM 34. Thus a table is selected immediately prior to the beginning of a transient occurring at the center tap of the delay line 38.

Transients having a duration greater than a predetermined duration are precluded from being reconstructed as in the FIG. 3 embodiment, by the inclusion of the detector 20. In the FIG. 4 apparatus, the reset pulse provided by the detector 20 is also applied to reset the delay line 16 and the edge detector 28, so that start signals being propagated through these elements for such transients are precluded from enabling the accumulator.

Figure 5:
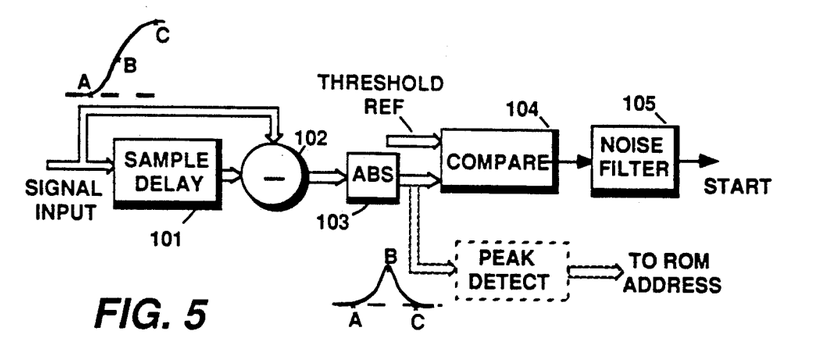
FIG. 5 is a block diagram of apparatus for detecting the beginning of a signal transition.

FIG. 5 shows exemplary circuitry which may be substituted for the start detector 12. The input signal is applied to a delay element 101 and a first input terminal of a subtracter 102. The output of the delay element 101 is coupled to a second input of the subtracter 102 which provides difference samples. The delay element 101 delays samples by one or a small number of sample periods. The differences provided by the subtracter approximate the first derivative of the input signal. The output from the subtracter is applied to an absolute value circuit 103 which passes positive differences unaltered and complements negative differences. The response to a transition is illustrated by the curve adjacent the output of the absolute value circuit. The output of the absolute value circuit is applied to one input of a comparator 104. The comparator provides a bilevel output signal having logic zero and logic one values for sample values that are applied to its first input terminal that are lesser and greater respectively than a predetermined value. The output of the comparator may be applied to a further optional circuit 105 which may include a noise filter or a discriminator arranged to pass logic one values only for transitions whose duration exceeds a minimum number of sample periods. The output of the comparator or the further circuit 105 is utilized as the start signal.

The amplitude of the signal provided by the absolute value circuit is an indication of the steepness of the slope of the transition. This amplitude may be, for example, peak detected and utilized as a further partial address to the ROM to select further pattern tables for transient reconstruction. Alternatively, if it is desired to enhance negative transitions differently than positive transitions, the polarity of the differences provided by the subtracter 102 may be applied as a further partial address signal. The alternative partial address signals may be stored in further latch circuits (not shown) responsive to the stop signal and subsequently appended to the partial addresses provided by the latches 24 or 21.

Figure 6:
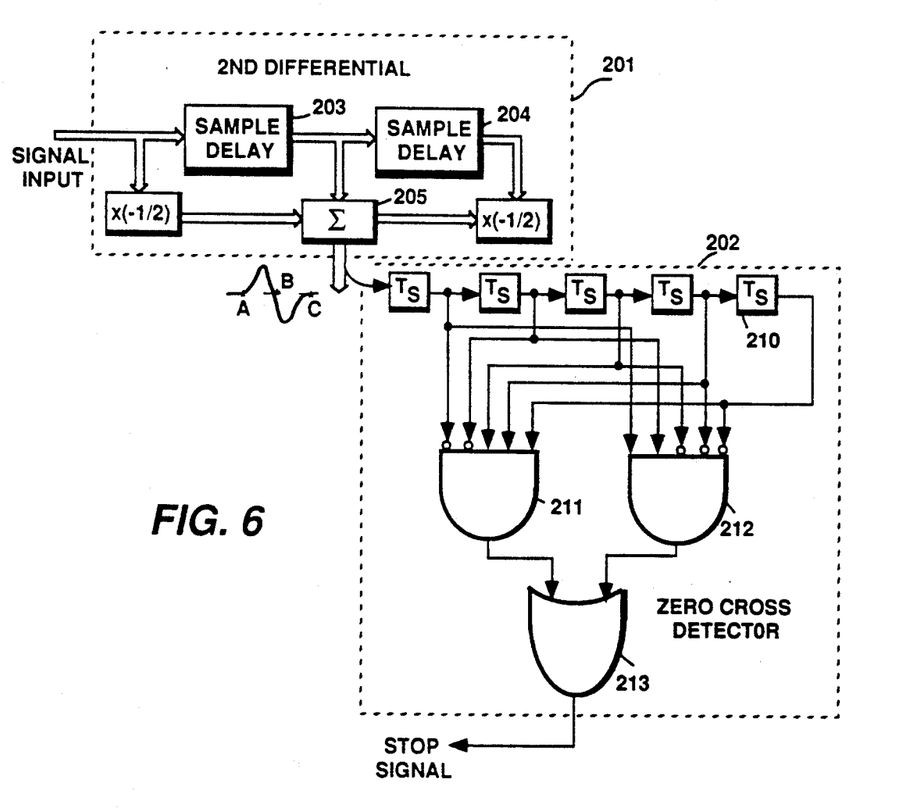
FIG. 6 is a block diagram of apparatus for detecting the midpoint of a signal transition.

FIG. 6 shows exemplary circuitry which may be substituted for the stop detector 10. This circuitry consists of two basic elements; a circuit 201 for providing the second derivative of the input signal, and a zero crossing detector 202. Second derivative circuits may be approximated with bandpass filters as illustrated in FIG. 6. It may be as simple as the exemplary filter illustrated, or one including considerably more delay elements, weighting circuits and summing means, depending on the accuracy of the desired response. The illustrated filter includes the cascade connection of two like delay elements 203 and 204, each providing one or a small number of sample periods. The input signal and the delayed input signal from delay element 204 are weighted by $-\frac{1}{2}$ and summed with the delayed input signal from delay element 203. The sum corresponds to an approximation of a second derivative of the input signal. The character of the response to a transition is indicated by the curve adjacent the output of the element 201. The center of a transition occurs at the point the second derivative crosses the zero axis, or the point at which the second derivative changes polarity. The zero crossing can therefor be detected by monitoring the sign bit of the values provided by element 201.

The zero crossing detector includes a cascade connection of five one-sample-period delay elements 210 coupled to the sign bit conductor of the element 201 output terminal, and having respective output terminals. Signals from the first and second output terminals of the cascade connection are applied to respective inverting input terminals of an AND gate 211. The last three output terminals of the cascade connection are coupled to respective non-inverting terminals of the AND gate 211 which produces a logic one signal, of one sample period duration, for the successive delay elements containing sign bit values of 00111 respectfully. That is the AND gate 211 detects a positive to negative zero crossing. The first two output terminals of the cascade connection are coupled to respective non-inverting input terminals of a second AND gate 212, and the last three output terminals of the cascade connection are coupled to respective inverting terminals of the AND gate 212. AND gate 212 produces an output pulse of one sample period duration only when the respective sign values at the successive output terminals of the cascade connection exhibit 11000 logic values respectively. As such the AND gate 212 detects the occurrence of negative to positive zero crossings.

The foregoing description and diagrams of the invention serve to provide the basic concept of the invention. Alternative embodiments comprised of ones of the circuit functions realized with either lesser or greater sophistication may be created based on the foregoing information, and such embodiments should be considered within the scope of the following claims.

What is claimed is:

1. Apparatus for enhancing signal transitions, comprising:
 a signal input terminal for receiving an input signal;
 a signal output terminal;
 delay means, coupled to said input terminal for providing a plurality of delayed signals, each of said delayed signals representing said input signal delayed by a different interval;
 multiplexing means, having a plurality of input terminals coupled to receive respective ones of said delayed signals, and responsive to control signals, for selectively coupling ones of said delayed signals to said signal output terminal;
 means coupled to said input terminal for detecting the occurrence of transitions in said input signal, and for measuring a feature of respective transitions for generating control values; and
 a memory means programmed with a plurality of tables of codewords, each table containing a coupling sequence, each codeword in respective tables containing an instruction for conditioning said multiplexing means to couple one of its input terminals to said output terminal, said memory means having a first partial address bus coupled to receive said control values for selecting respective tables, and a second partial address bus coupled to receive address values for sequencing through codewords in respective tables; and means for applying sequential address values to said second partial address bus.

2. Apparatus for enhancing signal transitions, comprising:

a signal input terminal for receiving an input signal;
a signal output terminal;
delay means, coupled to said input terminal for providing a plurality of delayed signals, each of said delayed signals representing said input signal delayed by a different interval;
multiplexing means, having a plurality of input terminals coupled to receive respective ones of said delayed signals, and responsive to control signals, for selectively coupling ones of said delayed signals to said signal output terminal;
means coupled to said input terminal for detecting the occurrence of transitions in said input signal, and for measuring a feature of respective transitions for generating control values including;
means for generating the first derivative of the input signal;
means responsive to said first derivative for providing said first derivative as a single polarity signal; and
means coupled to said single polarity signal for generating a signal having first and second states for said single polarity signal having values greater and lesser than a predetermined value respectively; and
means, responsive to said control values, for selecting one of a plurality of multiplexing means coupling sequences, wherein each of said coupling sequences represents said control signals.

3. The apparatus set forth in claim 2 wherein said means for generating the first derivative of the input signal includes:

further delay means having an input terminal coupled to said signal input terminal, and having an output terminal for providing said input signal delayed by one or a small number of signal sample periods;
a subtracter having first and second input terminals respectively coupled to the input and output terminals of said further delay means.

4. Apparatus for enhancing signal transitions, comprising:

a signal input terminal for receiving an input signal;
a signal output terminal;
delay means, coupled to said input terminal for providing a plurality of delayed signals, each of said delayed signals representing said input signal delayed by a different interval;
multiplexing means, having a plurality of input terminals coupled to receive respective ones of said delayed signals, and responsive to control signals, for selectively coupling ones of said delayed signals to said signal output terminal;
means coupled to said input terminal for detecting the occurrence of transitions in said input signal, and for measuring the duration of a predetermined portion of respective transitions for generating respective control values including;
means for counting pulses of a clock signal over an interval starting at the beginning of respective transitions and ending at substantially the midpoint of said transitions;
means for generating the first derivative of the input signal;
means responsive to said first derivative for providing said first derivative as a single polarity signal; and
means coupled to said single polarity signal for generating a bilevel signal having first and second states for said single polarity signal having values greater and lesser than a predetermined value respectively;
means for generating the second derivative of said input signal;
means responsive to said second derivative signal for generating signal pulses on the occurrence of said second derivative signal changing polarity; and
wherein said bilevel signal is applied to said counting means to condition said counting means to begin counting and said signal pulses are applied to said counting means to condition said counting means to terminate counting, with the count value in said counting means at termination of counting representing the duration of said predetermined portion; and
means, responsive to said control values, for selecting one of a plurality of multiplexing means coupling sequences, wherein each of said coupling sequences represents said control signals.

5. Apparatus for enhancing signal transitions, comprising:

a signal input terminal for receiving an input signal;
a signal output terminal;
delay means, coupled to said input terminal for providing a plurality of delayed signals, each of said delayed signals representing said input signal delayed by a different interval;
multiplexing means, having a plurality of input terminals coupled to receive respective ones of said delayed signals, and responsive to control signals, for selectively coupling ones of said delayed signals to said signal output terminal;
means coupled to said input terminal for detecting the occurrence of transitions in said input signal, and for measuring the duration of a predetermined portion of respective transitions for generating respective control values including;
means for generating the second derivative of said input signal; and
means responsive to said second derivative signal for generating signal pulses on the occurrence of said second derivative signal changing polarity; and
means, responsive to said control values, for selecting one of a plurality of multiplexing means coupling sequences, wherein each of said coupling sequences represents said control signals.

6. The apparatus set forth in claim 5 wherein said input signal is in binary format, and wherein said means for generating the second derivative of said input signal comprises a digital bandpass filter the output of which is a multibit signal including a polarity bit and value bits, and said means for generating signal pulses on the occurrence of said second derivative signal changing polarity is responsive to said polarity bit to the exclusion of said value bits.